(12) United States Patent
Wang

(10) Patent No.: US 8,806,720 B2
(45) Date of Patent: Aug. 19, 2014

(54) RACK TYPE TELESCOPIC HANDLE OF HORTICULTURAL SHEARS

(75) Inventor: Kuang-Pin Wang, Taichung (TW)

(73) Assignee: Green Guard Industry Ltd., Taichung (TW)

( * ) Notice: Subject to any disclaimer, the term of this patent is extended or adjusted under 35 U.S.C. 154(b) by 228 days.

(21) Appl. No.: 13/357,096

(22) Filed: Jan. 24, 2012

(65) Prior Publication Data

US 2013/0185945 A1    Jul. 25, 2013

(51) Int. Cl.
*B25G 1/04*    (2006.01)

(52) U.S. Cl.
USPC .............................. 16/429; 30/341; 403/109.3

(58) Field of Classification Search
USPC ........ 16/110.1, 113.1, 405, 429; 30/340, 341; 403/109.1, 109.3; 74/544; 280/47.371, 280/47.315, 655.1
See application file for complete search history.

(56) References Cited

U.S. PATENT DOCUMENTS

| | | | | |
|---|---|---|---|---|
| 1,636,069 A * | 7/1927 | Perry | ............................ | 292/172 |
| 5,228,202 A * | 7/1993 | Liao | ................................ | 30/249 |
| 5,404,616 A * | 4/1995 | Carmien | ......................... | 16/422 |
| 5,630,250 A * | 5/1997 | Chou | ........................... | 16/113.1 |
| 5,864,921 A * | 2/1999 | Chou | ............................. | 16/405 |
| 6,170,122 B1 * | 1/2001 | Kuo | ................................ | 16/405 |
| 6,883,208 B1 * | 4/2005 | Huang | ............................ | 16/429 |
| 7,574,806 B2 * | 8/2009 | Wang | ............................. | 30/340 |
| 7,774,901 B1 * | 8/2010 | Huang | ............................ | 16/429 |
| 8,128,306 B2 * | 3/2012 | Gorza | ........................ | 403/109.3 |

FOREIGN PATENT DOCUMENTS

DE    202012100219 U1 *   7/2012

* cited by examiner

*Primary Examiner* — William Miller
(74) *Attorney, Agent, or Firm* — Wang Law Firm, Inc.; Li K. Wang; Stephen Hsu

(57) ABSTRACT

A rack type telescopic handle of horticultural shears includes a fixed handle with a rack, a movable handle sheathed on the fixed handle, and a control device installed at an end of the movable handle, a movable gear pivotally coupled to the control device, and the control device controls an engagement and a separation of the movable gear with the rack, so that the movable handle can slide to an appropriate position on the fixed handle before the movable handle is fixed to the fixed handle so as to adjust the length of the handle of the horticultural shears.

12 Claims, 8 Drawing Sheets

RACK TYPE TELESCOPIC HANDLE OF HORTICULTURAL SHEARS

BACKGROUND OF THE INVENTION (a) Field of the Invention

The present invention relates to a handle of horticultural shears, in particular to a rack-type telescopic handle that can be fixed by engaging a movable gear with a rack.

(b) Description of the Related Art

In gardening, horticultural shears are generally used for cutting, trimming and stylizing a plant, but the horticultural shears available in the market come with different specifications according to the size of the plant and requirements of the actual environment. However, if it is necessary to cut or trim a branch at a higher position during the process of cutting and trimming a plant, a climbing tool is required for the cutting or trimming since handles of the traditional horticultural shears generally come with a fixed length, thus making the horticultural cutting or trimming work tremendously inconvenient, or even jeopardizing the user's safety. Although horticultural shears with telescopic handles have been introduced, the conventional telescopic handles of the horticultural shears still have drawbacks including a complicated structure and an inconvenient use.

SUMMARY OF THE INVENTION

Therefore, it is a primary objective of the present invention to overcome the drawbacks of the prior art by providing a rack type telescopic handle of horticultural shears, wherein a movable gear and a rack can be engaged with or separated from each other to adjust the relative distance between a fixed handle and a movable handle to achieve the effect of adjusting the length of the handles of the horticultural shears.

To achieve the aforementioned objective, the present invention provides a rack type telescopic handle of horticultural shears comprising a fixed handle and a movable handle sheathed on the fixed handle, and the fixed handle includes a rack longitudinally installed thereon, and the movable handle includes a control device installed at an end of the movable handle and pivotally coupled to the movable gear, and the control device can control the movable gear and the rack to be engaged with or separated from one another.

The control device comprises a casing and a driving push-button coupled to the casing and reciprocally slidable on the casing, and the casing has a through hole, and the movable gear is pivotally coupled to the casing by a pivot and disposed in the through hole, and the driving push-button has a bump disposed at the bottom of the driving push-button, and the movable gear includes an engagement driving portion and a separation driving portion disposed at the top of the movable gears on both sides of the pivot respectively and corresponding to the bumps.

The control device includes a front guide base and a rear guide base, and both front guide base and rear guide base have a guide slot, and the driving push-button has a guide installed thereon and corresponding to the guide slot.

The rear guide base has a positioning pin installed therein, and the positioning pin has a position restoring spring sheathed thereon, and an end of the position restoring spring abuts the rear guide base, and the other end of the position restoring spring abuts the driving push-button.

A grip is installed at the other end of the movable handle, and a link mechanism is installed between the grip and the control device.

The link mechanism comprises a link rod and a rear driving push-button, wherein the link rod is installed in the movable handle, and the rear driving push-button is installed on the grip and can be moved back and forth on the grip. An end of the link rod is coupled to the rear driving push-button, and the other end of the link rod is coupled to the driving push-button.

A latch groove is formed at both ends of the link rod separately, and a lower end of the driving push-button is latched into one of the latch grooves, and a lower end of the rear driving push-button is latched into the other latch groove.

The present invention also provides another preferred embodiment, wherein an end of the movable gear is extended to form a pressing portion, and a position restoring spring is installed between the pressing portion and the casing.

The present invention has the following advantages. The movable handle is sheathed on the fixed handle, and the fixed handle has a rack installed thereon, and the movable handle has a control device installed at an end of the movable handle and pivotally coupled to a movable gear, such that the control device can control the engagement and separation of the movable gear and the rack. When the movable gear is not engaged with the rack, the movable handle can slide along the fixed handle. The control device is released after the movable handle is adjusted to an appropriate position, and the control device restores its position and locks the movable gear with the rack. Now, the movable handle is fixed to the fixed handle, and the horticultural shears can be used normally. This arrangement can adjust the handle of the horticultural shears to an appropriate length to meet different application requirements. Obviously, the present invention is convenient-to-use, highly adaptable, and convenient-to-store.

DETAILED DESCRIPTION OF THE PREFERRED EMBODIMENTS

Figure 1:
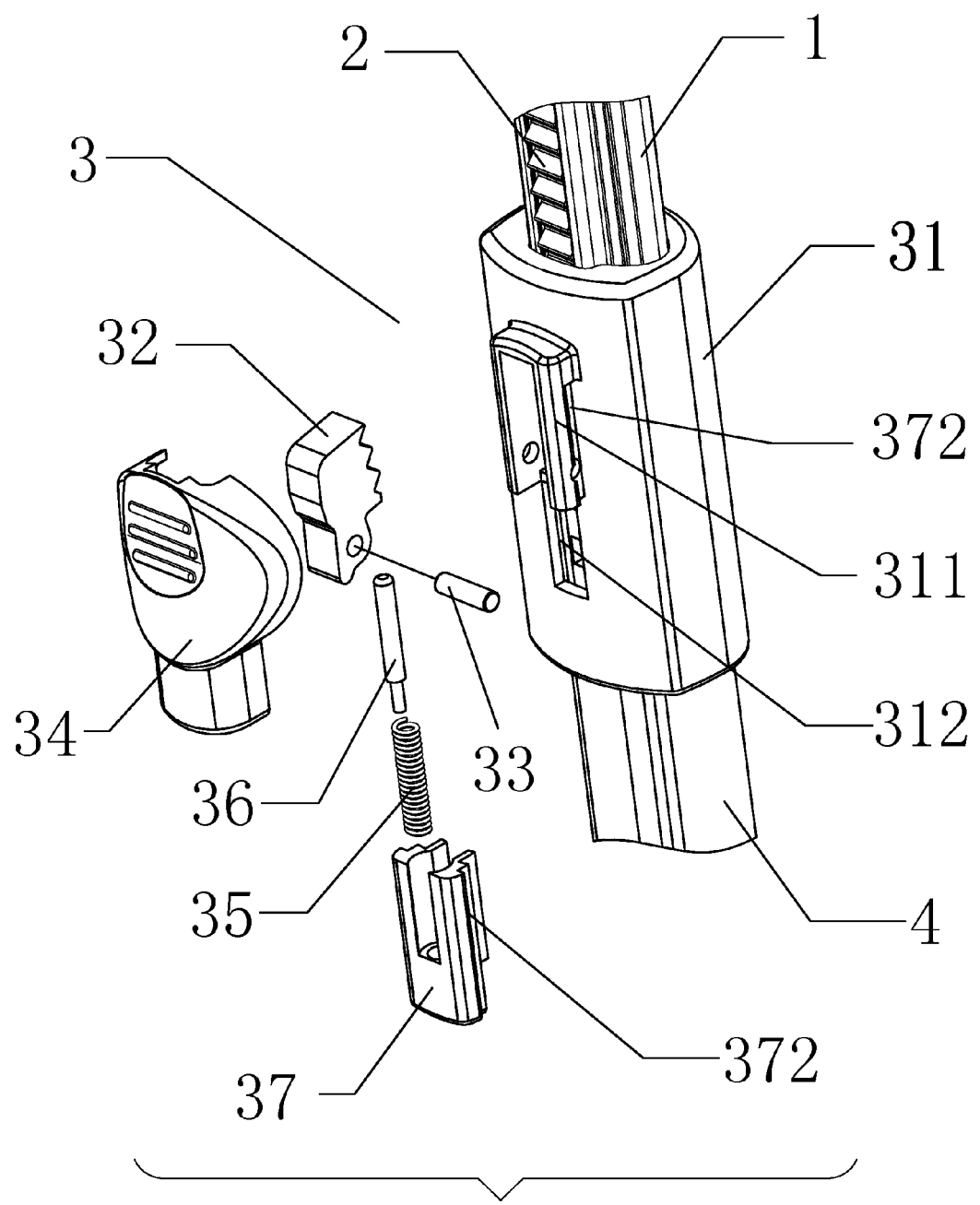
FIG. 1 is an exploded view of a first preferred embodiment of the present invention.
Figure 2:
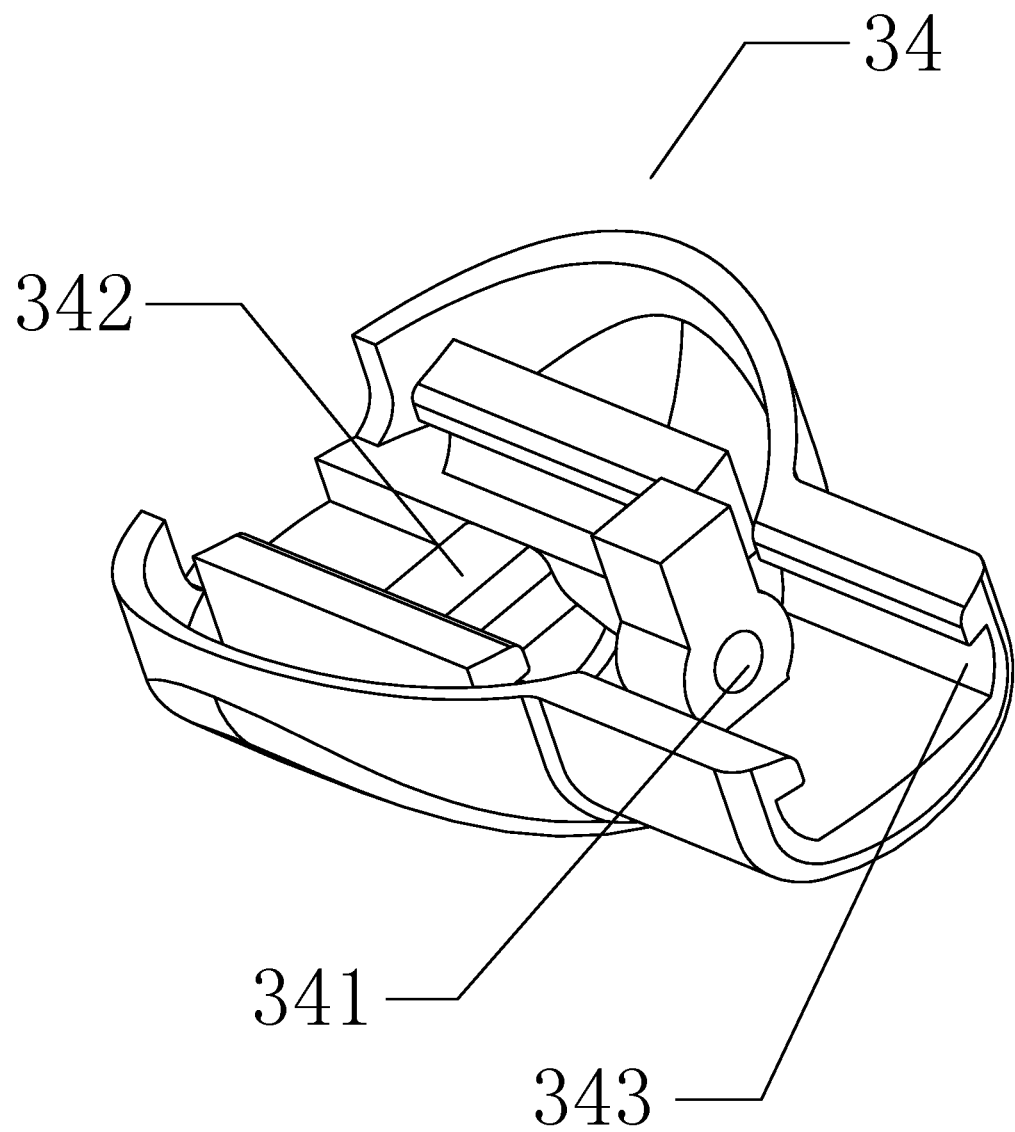
FIG. 2 is a schematic view of a casing in accordance with the first preferred embodiment of the present invention viewing from another angle.
Figure 3:
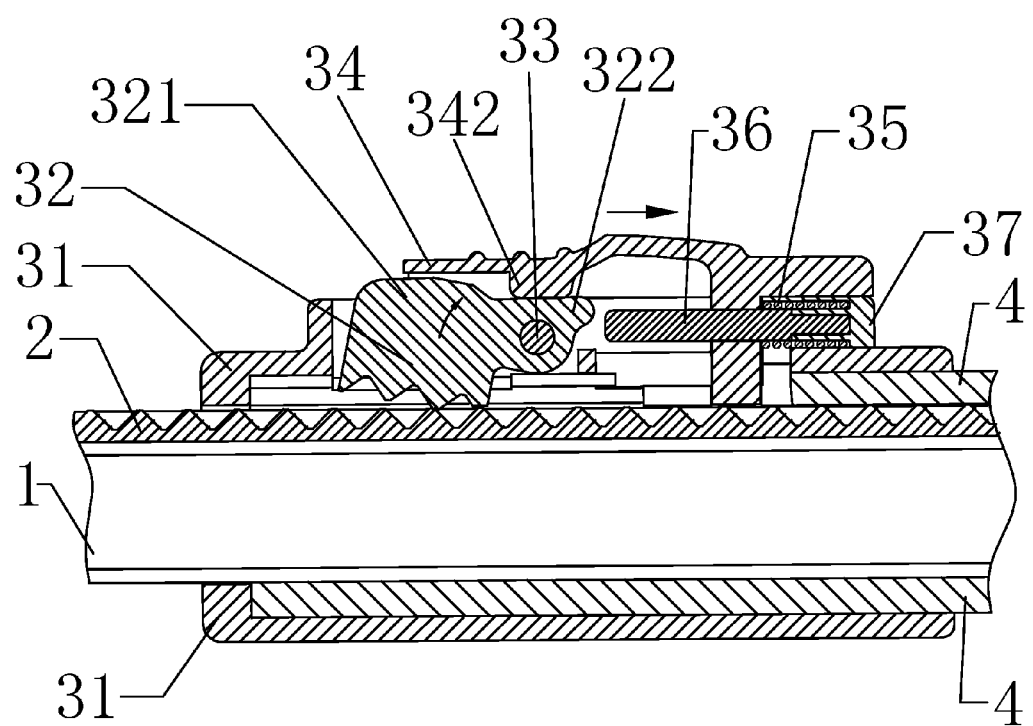
FIGS. 3 and 4 are schematic views showing movements of the first preferred embodiment of the present invention.
Figure 4:
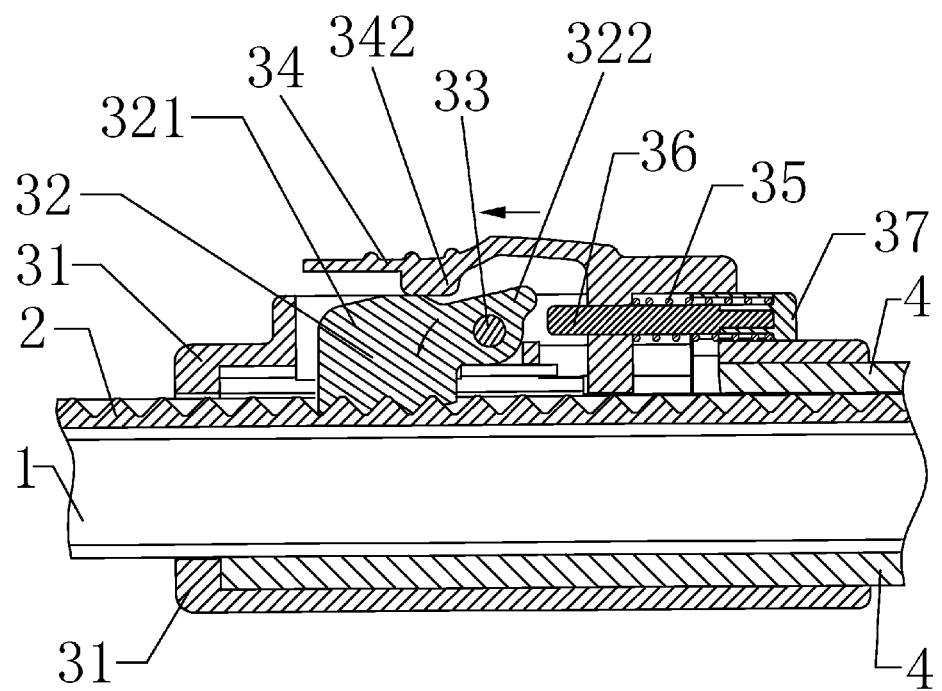

With reference to FIGS. 1 to 4 for the first preferred embodiment of the present invention, this preferred embodiment comprises a fixed handle 1 and a movable handle 4 sheathed on the fixed handle 1, wherein the fixed handle 1 has a rack longitudinally installed on the rack 2, and the movable handle 4 has a control device 3 installed at an end of the movable handle 4 and pivotally coupled to a movable gear 32, and the control device 3 can control an engagement and a separation of the movable gear 32 and the rack 2.

In the figures, the control device 3 comprises a casing 31, a driving push-button 34 coupled to the casing 31, a front guide base 311 and a rear guide base 37 disposed on the control device 3, a guide slot 372 formed on the front guide base 311 and the rear guide base 37 separately, and a guide 343 installed on the driving push-button 34 and corresponding to the guide slot 372. Therefore, the driving push-button 34 can slide back and forth along the front guide base 311 and the rear guide base 37 on the casing 31.

In the figures, the casing 31 has a through hole 312, and the movable gear 32 is pivotally coupled to the casing 31 by a pivot 33 and disposed in the through hole 312, and the driving push-button 34 has a bump 342 formed at the bottom of the driving push-button 34, and an engagement driving portion 321 and a separation driving portion 322 are disposed at the top of the movable gear 32 on both sides of the pivot 33 respectively and corresponding to the bump 342. When the driving push-button 34 slides forward, the bump 342 abuts the top of the engagement driving portion 321, so that the movable gear 32 is rotated counterclockwise and engaged with the rack 2. Now, the control device 3 locks the fixed handle 1, and the movable handle 4 is fixed. When the driving push-button 34 slides backward, the bump 342 abuts the top of the separation driving portion 322, so that the movable gear 32 is rotated clockwise and separated from the rack 2, and the control device 3 no longer locks the fixed handle 1, and the movable handle 4 can slidably moved along the fixed handle 1 to make adjustments.

In the figures, the rear guide base 37 has a positioning pin 36 installed therein, and the other end of the positioning pin 36 and a sliding hole 341 formed at a lower end of the driving push-button 34 are installed corresponding to each other, and a position restoring spring 35 is sheathed on the positioning pin 36, and an end of the position restoring spring 35 abuts the rear guide base 37, and the other end of the position restoring spring 35 abuts the driving push-button 34. Since the rear guide base 37 and the control device 3 are installed and fixed, therefore the position restoring spring 35 produces an axial elastic force to the driving push-button 34, such that when the driving push-button 34 slides backward to adjust the movable handle 4 to a desired position, the driving push-button 34 is released. Due to the elastic force of the position restoring spring 35, the driving push-button 34 slides forward to drive the bump 342 to abut the top of the engagement driving portion 321, so that the movable gear 32 is rotated counterclockwise and engaged with the rack 2, and the control device 3 locks the fixed handle 1, and the movable handle 4 is fixed again. Obviously, the operation is convenient and quick. In addition, the present invention can prevent the driving push-button 34 from sliding downward and the handle from loosening during the use of the horticultural shears, so as to achieve an automatic locking effect.

Figure 5:
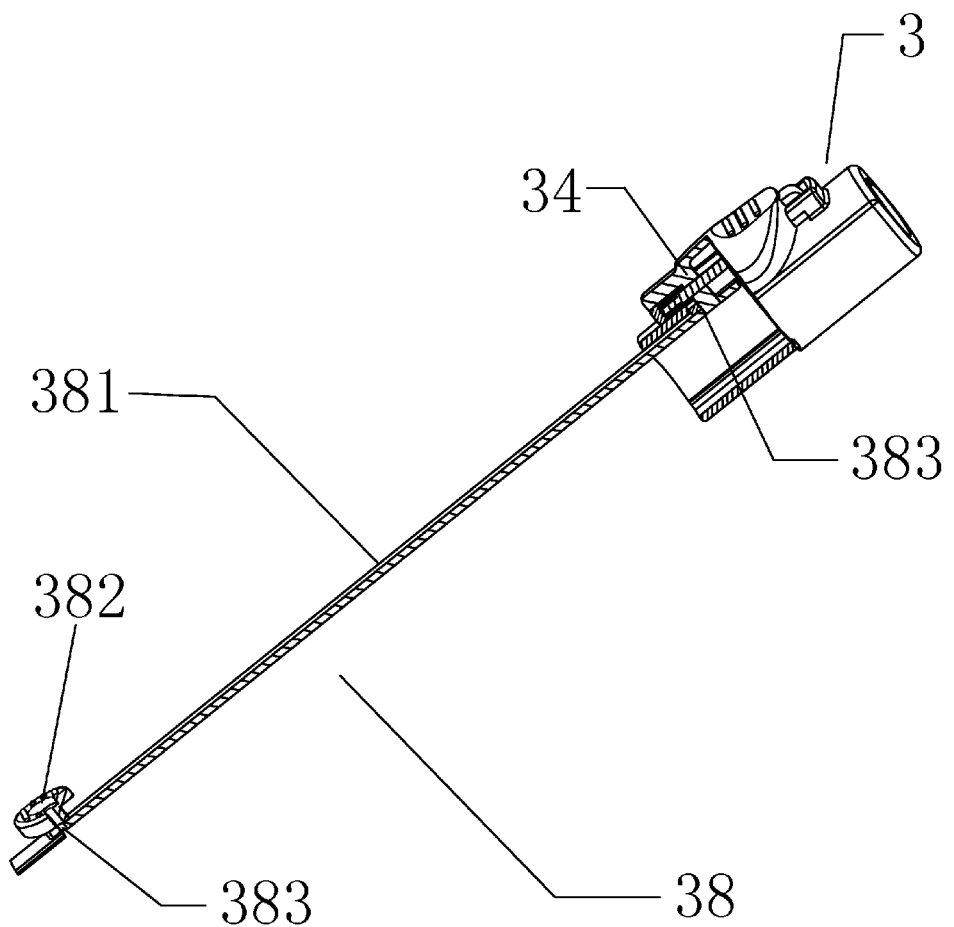
FIG. 5 is a longitudinal cross-sectional view of a second preferred embodiment of the present invention.
Figure 6:
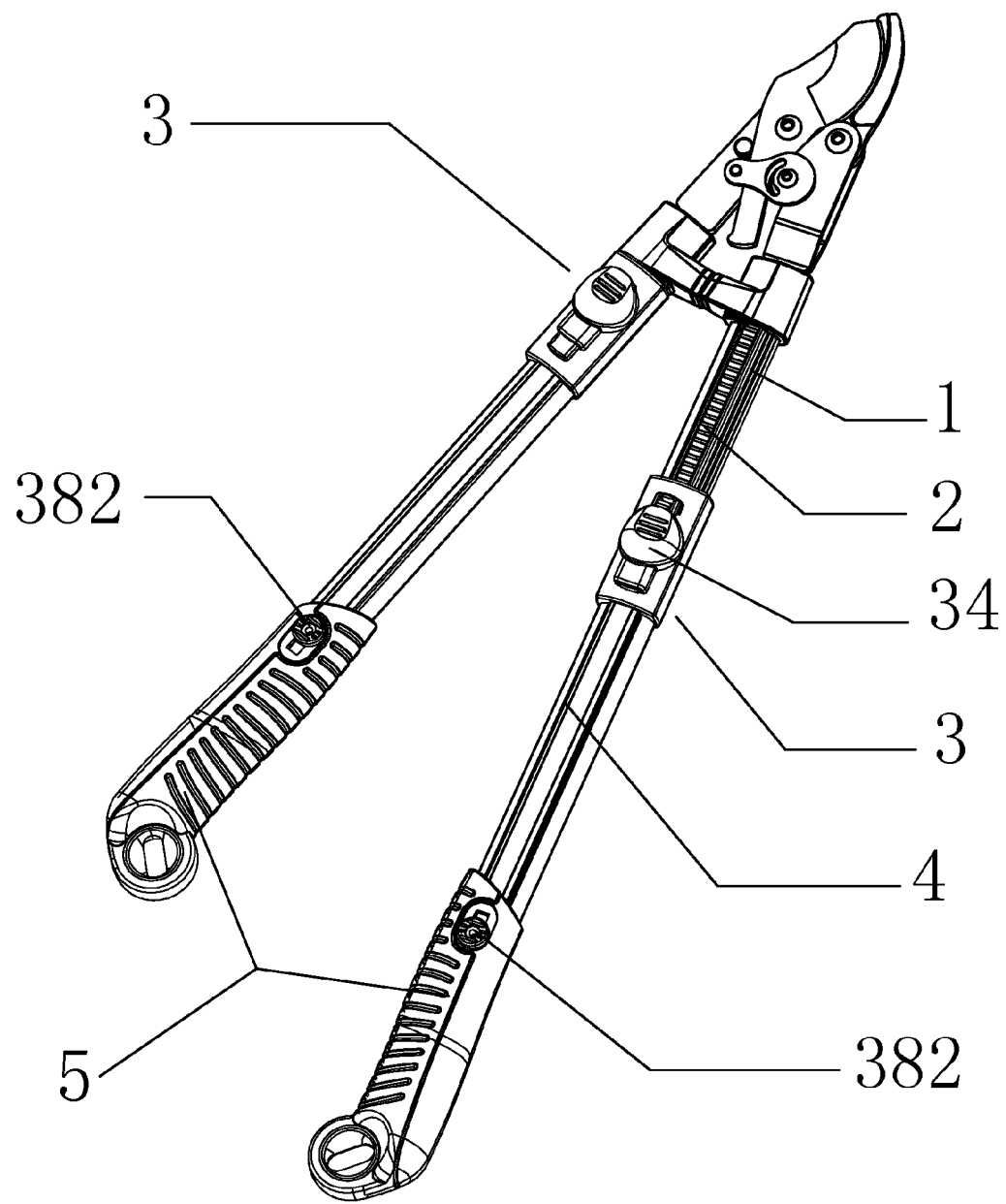
FIG. 6 is a perspective view of the second preferred embodiment of the present invention.
Figure 7:
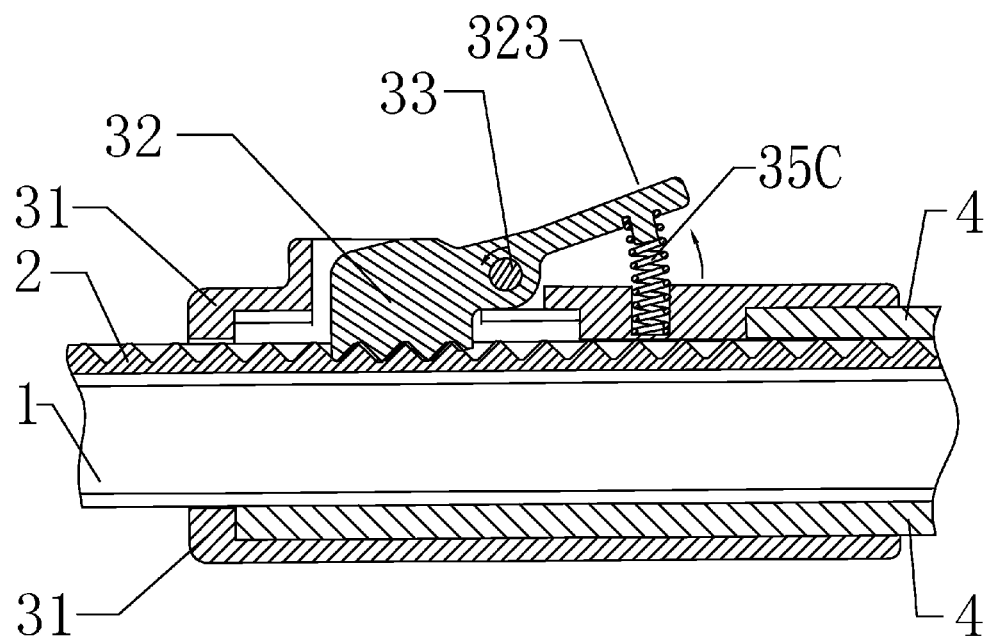
FIGS. 7 and 8 are schematic views showing movements of the third preferred embodiment of the present invention.
Figure 8:
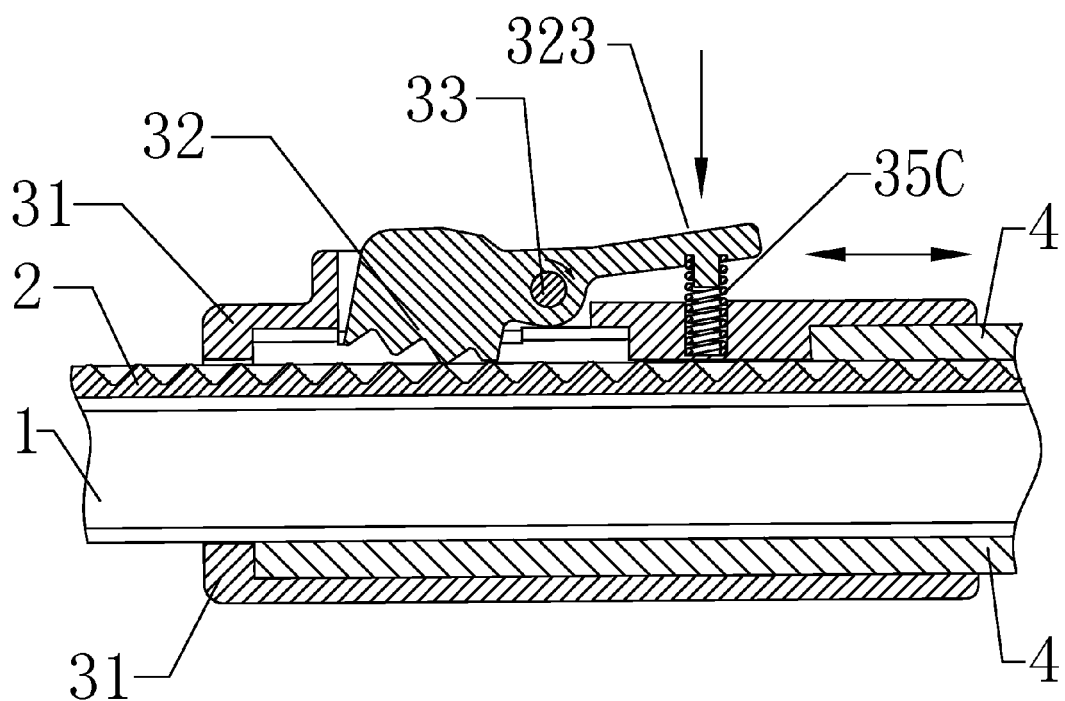

With reference to FIGS. 5 and 6 for the second preferred embodiment of the present invention, this preferred embodiment is based on the first preferred embodiment, and a grip 5 is installed at the other end of the movable handle 4, and a link mechanism 38 is installed between the grip 5 and the control device 3. The link mechanism 38 comprises a link rod 381 and a rear driving push-button 382, wherein the link rod 381 is installed in the movable handle 4, and the rear driving push-button 382 is installed on the grip 5 and reciprocally movable on the grip 5. A latch groove 383 is formed at both ends of the link rod 381 separately, and the bottom of the driving push-button 34 is latched into one of the latch grooves 383, and the bottom of the rear driving push-button 382 is latched into the other latch groove 383, so that the rear driving push-button 382 and the driving push-button 34 can be coupled with each other by the link rod 381. When the rear driving push-button 382 is pushed to move back and forth, the driving push-button 34 is moved synchronously, so that the rear driving push-button 382 can control the switch of the control device 3, and the length of the handle can be adjusted by holding the grip 5 and pulling the rear driving push-button 382 without the need of holding the control device 3 to make an adjustment for each time. The invention provides a user-friendly design, a convenient adjustment, and a convenient way for gardening With reference to FIGS. 7 and 8 for the third preferred embodiment of the present invention, the difference between this preferred embodiment and the first preferred embodiment resides on that an end of the movable gear 32 is extended to become a pressing portion 323, and a position restoring spring 35C is installed between the pressing portion 323 and the casing 31. When the pressing portion 323 is pressed, the movable gear 32 is rotated clockwise and separated from the rack 2, and the control device 3 no longer locks the fixed handle 1, so that the movable handle 4 can slide along the fixed handle 1 for making adjustments. After the movable handle 4 is adjusted to an appropriate position, the pressing portion 323 is released. Due to the elastic force of the position restoring spring 35C, the movable gear 32 is rotated counterclockwise and engaged with the rack 2. Now, the control device 3 locks the fixed handle 1, and the movable handle 4 is fixed, so as to achieve the effect of adjusting the length of the handle of the horticultural shears with a simple structure and a convenient operation.

Of course, the switch of the control device 3 of the present invention can be controlled by other methods such as using a screw thread to lock and unlock the movable gear 32, or using a knob to control the rotation of the movable gear 32 in order to loosen the movable gear 32 from the rack 2 or engage the movable gear 32 with the rack 2.

I claim:

1. A telescopic handle of horticultural shears, comprising a fixed handle and a movable handle sheathed on the fixed handle, wherein the fixed handle comprises a rack longitudinally installed thereon, a control device installed at an end of the movable handle, a movable gear pivotally coupled to the control device by a pivot and engageable to the rack, an engagement driving portion and a separation driving portion formed at both ends of the movable gear on both sides of the pivot respectively, and both engagement and separation driving portions being controlled to ascend or descend alternately by using the pivot as a fulcrum, so that the movable gear and the rack are engaged with or separated from each other to adjust relative positions of the fixed handle and the movable handle, wherein the control device comprises a casing and a driving push-button coupled to the casing and reciprocally slidable on the casing, and the casing has a through hole, and the movable gear is pivotally coupled to the casing by the pivot and disposed in the through hole, and the driving push-button is disposed above the through hole, and the driving push-button has a bump and pushes the engagement driving portion and the separation driving portion of the movable gear by moving the driving push-button reciprocally.

2. The telescopic handle of horticultural shears as recited in claim 1, wherein the movable handle includes a grip installed at another end of the movable handle, and a link mechanism installed between the grip and the control device.

3. The telescopic handle of horticultural shears as recited in claim 2, wherein the link mechanism comprises a link rod and a rear driving push-button, and the link rod is installed in the movable handle, and the rear driving push-button is installed on the grip and reciprocally movable on the grip, and an end of the link rod is coupled to the rear driving push-button, and the other end of the link rod is coupled to the driving push-button.

4. The telescopic handle of horticultural shears as recited in claim 3, wherein the link rod includes a latch groove formed at both ends separately, and the driving push-button is latched into one of the latch grooves, and the rear driving push-button is latched into the other latch groove.

5. The telescopic handle of horticultural shears as recited in claim 1, wherein the control device comprises a front guide base and a rear guide base, and both front guide base and rear guide base have a guide slot formed thereon, and the driving push-button has a guide installed thereon and corresponding to the guide slot.

6. The telescopic handle of horticultural shears as recited in claim 5, wherein the movable handle includes a grip installed at another end of the movable handle, and a link mechanism installed between the grip and the control device.

7. The telescopic handle of horticultural shears as recited in claim 6, wherein the link mechanism comprises a link rod and a rear driving push-button, and the link rod is installed in the movable handle, and the rear driving push-button is installed on the grip and reciprocally movable on the grip, and an end of the link rod is coupled to the rear driving push-button, and the other end of the link rod is coupled to the driving push-button.

8. The telescopic handle of horticultural shears as recited in claim 7, wherein the link rod includes a latch groove formed at both ends separately, and the driving push-button is latched into one of the latch grooves, and the rear driving push-button is latched into the other latch groove.

9. The telescopic handle of horticultural shears as recited in claim 5, wherein the rear guide base includes a positioning pin installed therein, and the positioning pin includes a position restoring spring sheathed thereon, and an end of the position restoring spring abuts the rear guide base, and the other end of the position restoring spring abuts the driving push-button.

10. The telescopic handle of horticultural shears as recited in claim 9, wherein the movable handle includes a grip installed at another end of the movable handle, and a link mechanism installed between the grip and the control device.

11. The telescopic handle of horticultural shears as recited in claim 10, wherein the link mechanism comprises a link rod and a rear driving push-button, and the link rod is installed in the movable handle, and the rear driving push-button is installed on the grip and reciprocally movable on the grip, and an end of the link rod is coupled to the rear driving push-button, and the other end of the link rod is coupled to the driving push-button.

12. The telescopic handle of horticultural shears as recited in claim 11, wherein the link rod includes a latch groove formed at both ends separately, and the driving push-button is latched into one of the latch grooves, and the rear driving push-button is latched into the other latch groove.

* * * * *